United States Patent
McConnaughay et al.

(10) Patent No.: US 11,012,259 B1
(45) Date of Patent: May 18, 2021

(54) SYSTEMS AND METHODS FOR PRESERVING SYSTEM CONTEXTUAL INFORMATION IN AN ENCAPSULATED PACKET

(71) Applicant: CA, INC., San Jose, CA (US)

(72) Inventors: Mark McConnaughay, Ontario (CA); Gary Tomic, Ontario (CA); Ron Frederick, Mountain View, CA (US)

(73) Assignee: CA, Inc., San Jose, CA (US)

( * ) Notice: Subject to any disclaimer, the term of this patent is extended or adjusted under 35 U.S.C. 154(b) by 0 days.

(21) Appl. No.: 16/130,977

(22) Filed: Sep. 13, 2018

(51) Int. Cl.
*H04L 12/46* (2006.01)
*H04L 29/06* (2006.01)
*H04L 29/12* (2006.01)
*H04L 29/08* (2006.01)

(52) U.S. Cl.
CPC ...... *H04L 12/4633* (2013.01); *H04L 12/4641* (2013.01); *H04L 61/251* (2013.01); *H04L 67/1002* (2013.01); *H04L 69/167* (2013.01); *H04L 69/22* (2013.01)

(58) Field of Classification Search
CPC . H04L 2/4633; H04L 12/4641; H04L 61/251; H04L 67/1002; H04L 69/167; H04L 69/22
See application file for complete search history.

(56) References Cited

U.S. PATENT DOCUMENTS

| | | | |
|---|---|---|---|
| 9,699,117 B2 * | 7/2017 | Koganti | H04L 49/357 |
| 2009/0063706 A1 * | 3/2009 | Goldman | H04L 45/00 |
| | | | 709/250 |
| 2009/0154461 A1 * | 6/2009 | Kitani | H04L 12/4633 |
| | | | 370/392 |
| 2015/0127701 A1 * | 5/2015 | Chu | H04L 45/22 |
| | | | 709/201 |
| 2015/0195137 A1 * | 7/2015 | Kashyap | H04L 61/103 |
| | | | 370/254 |
| 2015/0350081 A1 * | 12/2015 | DeCusatis | H04L 47/12 |
| | | | 370/235 |

(Continued)

OTHER PUBLICATIONS

"Virtual Server via IP Tunneling" at Linux Virtual Server, as accessed on Sep. 28, 2018 at http://www.inuxvirtualserver.org/VS-IPTunneling.html, 10 pages.

(Continued)

*Primary Examiner* — William G Trost, IV
*Assistant Examiner* — Monishwar Mohan
(74) *Attorney, Agent, or Firm* — FisherBroyles, LLP

(57) ABSTRACT

The disclosed computer-implemented method for preserving system contextual information in an encapsulated packet may include (1) receiving, at a computing device, a network packet from the network via a network adapter port, (2) encapsulating the received network packet with a tunnel header, where a network identifier field in the tunnel header comprises information identifying the network adapter port, (3) determine an outer Internet protocol (IP) address for the encapsulated network packet, where the destination IP address corresponds to a destination on the network, (4) addressing an outer header of the encapsulated network packet with the IP address, and (5) sending the encapsulated network packet toward the destination identified by the destination IP address. Various other methods, systems, and computer-readable media are also disclosed.

24 Claims, 9 Drawing Sheets

(56) References Cited

U.S. PATENT DOCUMENTS

| | | | | |
|---|---|---|---|---|
| 2016/0211989 | A1* | 7/2016 | Jain | H04L 12/4633 |
| 2017/0163598 | A1* | 6/2017 | Shen | H04L 45/74 |
| 2018/0007123 | A1* | 1/2018 | Cheng | H04L 12/4641 |
| 2018/0062923 | A1* | 3/2018 | Katrekar | H04L 63/0272 |
| 2018/0219773 | A1* | 8/2018 | Li | H04L 45/64 |
| 2018/0270146 | A1* | 9/2018 | Jiang | H04L 45/16 |
| 2018/0287938 | A1* | 10/2018 | Han | H04L 45/74 |
| 2018/0309595 | A1* | 10/2018 | Ma | H04L 12/46 |
| 2019/0036868 | A1* | 1/2019 | Chandrashekhar | H04L 61/103 |
| 2019/0068496 | A1* | 2/2019 | Tessmer | H04L 45/74 |
| 2019/0158605 | A1* | 5/2019 | Markuze | H04L 12/465 |
| 2019/0253274 | A1* | 8/2019 | Van Dussen | H04L 41/0806 |
| 2019/0306060 | A1* | 10/2019 | Sharma | H04L 69/22 |

OTHER PUBLICATIONS

Assmann, Baptiste, "Layer 4 load balancing tunnel mode" on Haproxy, as accessed on Sep. 28, 2018 at https://www.haproxy.com/blog/layer-4-load-balancing-tunnel-mode/, 7 pages.
"Chapter: Implementing VXLAN" in "L2VPN and Ethernet Services Configuration Guide for Cisco ASR 9000 Series Routers, IOS XR Release 6.2.x"; Cisco, Inc. as accessed on Sep. 28, 2018 at https://www.cisco.com/c/en/us/td/docs/routers/asr9000/software/asr9k-r6-2/lxvpn/configuration/guide/b-l2vpn-cg-asr9000-62x/b-l2vpn-cg-asr9000-62x_chapter_01010.html, 15 pages.

* cited by examiner

SYSTEMS AND METHODS FOR PRESERVING SYSTEM CONTEXTUAL INFORMATION IN AN ENCAPSULATED PACKET

BACKGROUND

Load balancing plays an important role in distributing workloads across multiple computing resources to increase reliability and capacity of processes. In some examples, network load balancers traditionally change either level 2 (Media Access Control) or level 3 (Internet Protocol) packet information when load balancing to external components. However, traditional techniques do not support providing additional system context information in the packet flow. Further, traditional techniques do not support addressing multiple endpoints on a single load-balanced Internet Protocol destination. The instant disclosure, therefore, identifies and addresses a need for systems and methods for preserving system contextual information in an encapsulated packet.

SUMMARY

As will be described in greater detail below, the instant disclosure describes various systems and methods for preserving system contextual information in an encapsulated packet.

In some examples, a method for preserving system contextual information in an encapsulated packet may include (1) receiving, at a computing device connected to a network, a network packet from the network via a network adapter port, (2) encapsulating the received network packet with a tunnel header, where a network identifier field in the tunnel header includes information identifying the network adapter port, (3) determine an outer Internet protocol (IP) address for the encapsulated network packet, where the destination IP address corresponds to a destination on the network, (4) addressing an outer header of the encapsulated network packet with the IP address, and (5) sending the encapsulated network packet toward the destination identified by the destination IP address.

In some examples, the network identifier field may further include information describing at least one of network adapter port information and a function to be performed on the received network packet. In an embodiment, the method may further include identifying a function to be performed on the received network packet and assigning a network identifier to the network identifier field based on the function to be performed. In an example, the function to be performed may be performed by another computing device. In some embodiments, the function may be a security action.

In some examples, the method may further include assigning a network identifier to a specific function. In an embodiment, a network identifier may identify a subcomponent of another computing device.

In an example, encapsulating may leave contents of the received network packet unchanged.

In some embodiments, addressing the outer IP header may further include (1) querying another computing device to identify a virtual subcomponent of the other computing device and (2) using the external IP address of the other computing device as the destination IP address.

In some examples, sending may further include (1) determining the destination of the encapsulated network packet is within the computing device, (2) decapsulating the encapsulated packet, and (3) forwarding the decapsulated network packet to the destination in the computing device.

In some examples, determining the outer IP address for the encapsulated network packet may include using the information identifying the network adapter port to determine the IP address.

In an embodiment, the method may further include performing a function on the decapsulated packet, where the function uses the information identifying the network adapter port.

In some embodiments, sending may further include (1) determining the destination of the encapsulated network packet is in another computing device, (2) updating the outer IP header with a respective address of the other computing device, and (3) forwarding the encapsulated network packet to the other computing device.

In some examples, the method may further include (1) querying another computing device to identify a specific function of the other computing device and (2) mapping a network identifier associated with the specific function of the other computing device to an external IP address of the other computing device.

In an embodiment, the method may further include translating the network identifier of the specific function of the other computing device to the external IP address of the other computing device, where addressing the outer IP header further includes using the external IP address of the other computing device as the destination IP address.

In some embodiments, (1) the received network packet is IPv4 compatible and the encapsulated network packet is IPv6 compatible, (2) the received network packet is IPv6 compatible and the encapsulated network packet is IPv4 compatible, (3) the received network packet is IPv4 compatible and the encapsulated network packet is IPv4 compatible, and/or (4) the received network packet is IPv6 compatible and the encapsulated network packet is IPv6 compatible.

In one embodiment, a system for preserving system contextual information in an encapsulated packet may include at least one physical processor connected to a network and physical memory that includes computer-executable instructions that, when executed by the physical processor, cause the physical processor to (1) receive a network packet from the network via a network adapter port, (2) encapsulate the received network packet with a tunnel header, where a network identifier field in the tunnel header includes information identifying the network adapter port, (3) determine an outer Internet protocol (IP) address for the encapsulated network packet, where the destination IP address corresponds to a destination on the network, (4) address an outer header of the encapsulated network packet with the IP address, and (5) send the encapsulated network packet toward the destination identified by the destination IP address.

In some examples, the above-described method may be encoded as computer-readable instructions on a non-transitory computer-readable medium. For example, a computer-readable medium may include one or more computer-executable instructions that, when executed by at least one processor of a computing device connected to a network, may cause the computing device to (1) receive, at the computing device, a network packet from the network via a network adapter port, (2) encapsulate the received network packet with a tunnel header, where a network identifier field in the tunnel header includes information identifying the network adapter port, (3) determine an outer Internet protocol (IP) address for the encapsulated network packet, where the destination IP address corresponds to a destination on the network, (4) address an outer header of the encapsulated network packet with the IP address, and (5) send the encapsulated network packet toward the destination identified by the destination IP address.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
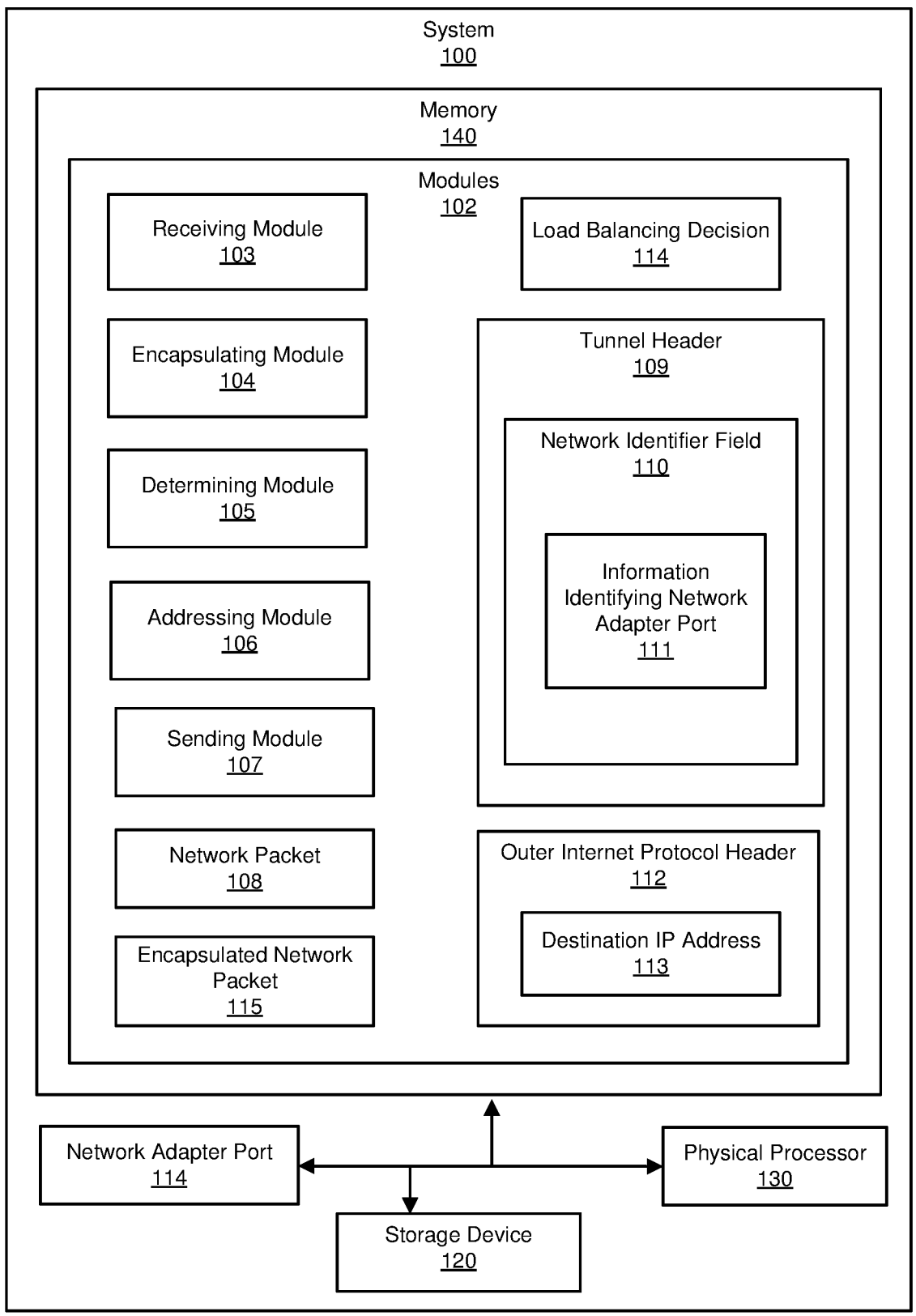
FIG. 1 is a block diagram of an example system for preserving system contextual information in an encapsulated packet.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preserving system contextual information in an encapsulated packet. Also provided are techniques for addressing multiple endpoints on a single Internet Protocol (IP) destination. In some examples, as will be explained in greater detail below, techniques described herein may automatically perform techniques that preserve system contextual information in encapsulated packets.

In some embodiments, provided techniques may preserve system contextual information in an encapsulated packet. Provided techniques may encapsulate a received network packet, update a network identifier field in a tunnel header to reflect a network adapter port on which the network packet arrived, forward the encapsulated network packet to a load balancer that may distribute workloads (e.g., processes to be performed by target devices on information carried within packets), receive the encapsulated network packet from the load balancer with the same network identifier information and forward the encapsulated network packet to the destination.

In some embodiments, provided techniques may address multiple endpoints on a single IP destination. Provided techniques may receive an encapsulated and load balanced network packet from a load balancer, utilize a component that determines load balanced destination of the network packet (via an outer IP header) and either (1) decapsulates the network packet and forwards the network packet to a known component on the same physical appliance or (2) preserves the encapsulated network packet and forwards the encapsulated network packet to a known component on another appliance by updating the outer IP header with an IP address that is selected based on the information in the network identifier field.

By doing so, the systems and methods described herein may improve computing devices. Examples of computing devices in which the provided techniques may be implemented include, and are not limited to, laptop computers, tablet computers, desktop computers, wearable computing devices (e.g., smart watches, smart glasses), smartphone devices, identify verification devices, access control devices, and/or smart televisions. As such, the provided techniques may advantageously provide additional system context information in network packet flows. Further, the provided techniques may advantageously address multiple endpoints on a single load-balanced Internet Protocol destination. Also, the systems and methods described herein may beneficially improve anti-malware services and/or software.

The following will provide, with reference to FIGS. 1-2 and 4-6, detailed descriptions of example systems for preserving system contextual information in an encapsulated packet. Detailed descriptions of corresponding computer-implemented methods will also be provided in connection with FIG. 3. Detailed descriptions of example encapsulated packets re described with respect to FIG. 7. In addition, detailed descriptions of an example computing system and network architecture capable of implementing one or more of the embodiments described herein will be provided in connection with FIGS. 8 and 9, respectively.

FIG. 1 is a block diagram of an example system 100 for preserving system contextual information in an encapsulated packet. As illustrated in this figure, example system 100 may include one or more modules 102 for performing one or more tasks. As will be explained in greater detail below, modules 102 may include a receiving module 103, an encapsulating module 104, a determining module 105, an addressing module 106, a sending module 107, a network packet 108, a tunnel header 109, a network identifier 110, information identifying a network adapter port 111 (e.g., network adapter port 150), an outer IP header 112, an outer Internet Protocol address 113, a load balancing decision 114, and/or an encapsulated network packet 115. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In some examples, storage device 120 may store, load, and/or maintain information. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions and connected to a network. In some examples, physical processor 130 may access and/or modify one or more of modules 102 stored in memory 140. Additionally or alternatively, physical processor 130 may execute one or more of modules 102 to facilitate preserving system contextual information in an encapsulated packet. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In some examples, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapter ports, such as network adapter port 150. In some examples, network adapter port 150 may be a physical network adapter connected to a physical network (e.g., network 204 in FIG. 2). In some examples, network adapter port 150 may be a virtual network adapter that passes packets between software components inside system 100.

Figure 2:
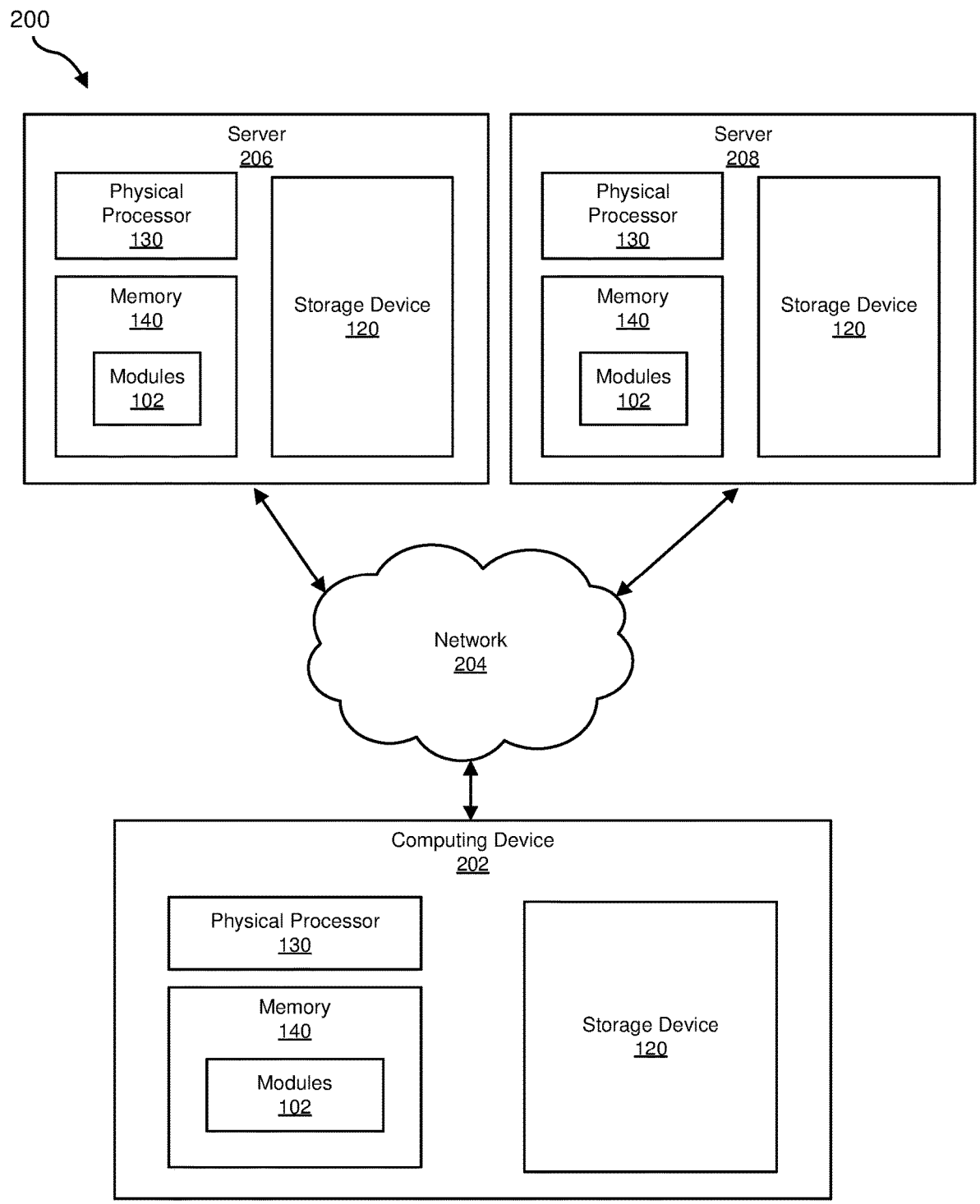
FIG. 2 is a block diagram of an additional example system for preserving system contextual information in an encapsulated packet.

Example system 100 in FIG. 1 may be implemented in a variety of ways. For example, all or a portion of example system 100 may represent portions of example system 200 in FIG. 2. As shown in FIG. 2, system 200 may include a computing device 202, a server 206, and/or a server 208 in communication via a network 204. In some examples, all or a portion of the functionality of modules 102 may be performed by computing device 202, server 206, server 208 and/or any other suitable computing system. As will be described in greater detail herein, one or more of modules 102 from FIG. 1 may, when executed by at least one processor of computing device 202, server 206, and/or server 208, enable computing device 202, server 206, and/or server 208 to preserve system contextual information in an encapsulated packet. For example, and as will be described in greater detail below, one or more of modules 102 may cause computing device 202, server 206, and/or server 208 to (1) receive network packet 108 from network 204 via network adapter port 150, (2) encapsulate received network packet 108 with tunnel header 109 to create encapsulated network packet 115, where network identifier field 110 in tunnel header 109 includes information identifying the network adapter port 111, (3) determine outer Internet protocol (IP) address 113 for the encapsulated network packet 115, where destination IP address 113 corresponds to a destination on network 204, (4) address outer IP header 112 of the encapsulated network packet 115 with destination IP address 113 in response to load balancing decision 114, and (5) send encapsulated network packet 115 toward the destination identified by destination IP address 113.

Computing device 202 generally represents any type or form of computing device capable of reading computer-executable instructions. In some examples, computing device 202 may represent a computer running load balancing software and/or configured to perform a network function. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In some examples, network 204 may facilitate communication between computing device 202, server 206, and/or server 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, computing device 206 may represent a computer running load balancing software and/or configured to perform a network function. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Server 208 generally represents any type or form of computing device that is capable of reading computer-executable instructions. In some examples, computing device 208 may represent a computer running load balancing software and/or configured to perform a network function. Additional examples of server 208 include, without limitation, security servers, application servers, web servers, storage servers, and/or database servers configured to run certain software applications and/or provide various security, web, storage, and/or database services. Although illustrated as a single entity in FIG. 2, server 208 may include and/or represent a plurality of servers that work and/or operate in conjunction with one another.

Figure 3:
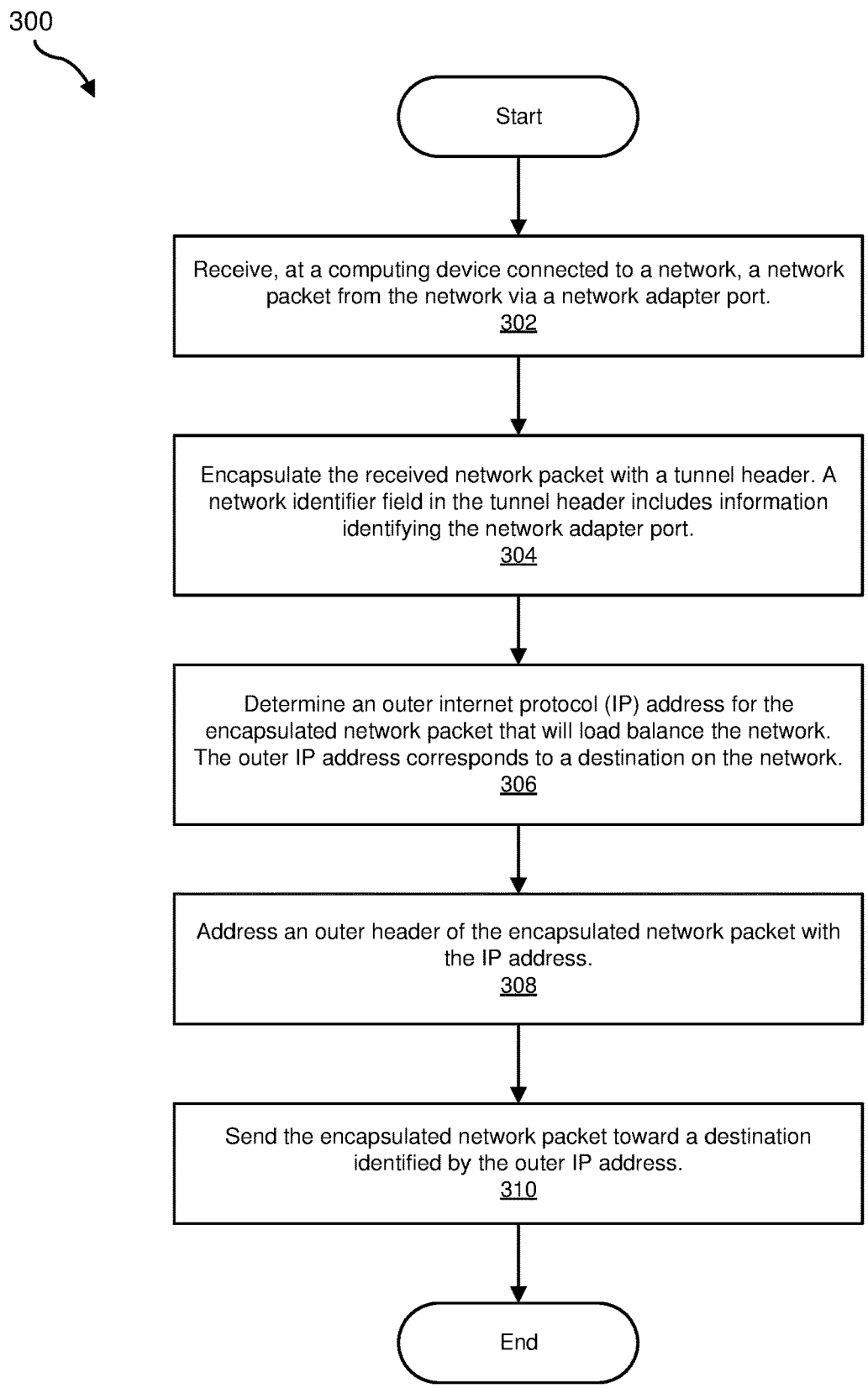
FIG. 3 is a flow diagram of an example method for preserving system contextual information in an encapsulated packet.

FIG. 3 is a flow diagram of an example computer-implemented method 300 for preserving system contextual information in an encapsulated packet. The steps shown in FIG. 3 may be performed by any suitable computer-executable code and/or computing system, including system 100 in FIG. 1, system 200 in FIG. 2, and/or variations or combinations of one or more of the same. In some examples, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive packets from networks via network adapter ports. The systems described herein may perform step 302 in a variety of ways. For example, receiving module 103 may, as part of computing device 202, server 206, and/or server 208 in FIG. 2, receive network packet 108 from network 204 via network adapter port 150.

As illustrated in FIG. 3, at step 304 one or more of the systems described herein may encapsulate received network packets with tunnel headers (e.g., VxLAN headers). Network identifier fields (e.g., VxLAN Identifiers (VNIs)) in tunnel headers may include information identifying the network adapter ports. The systems described herein may perform step 304 in a variety of ways. For example, encapsulating module 104 may, as part of computing device 202, server 206, and/or server 208 in FIG. 2, encapsulate received network packet 108 with tunnel header 109 to create encapsulated network packet 115, where network identifier field 110 in tunnel header 109 includes information identifying the network adapter port 111.

In some examples, network identifier fields may include information describing network adapter port information and/or functions to be performed on received network packets. In some embodiments, network identifier fields may include information describing a load-balanced network function. In some example, network adapter port information may include ingress network adapter port information and/or egress network adapter port information.

In some examples, method 300 may further include identifying functions to be performed on received network packets and assigning network identifiers to network identifier fields based on functions to be performed (e.g., on the received network packet). In an embodiment, functions to be performed may be performed by other computing devices. In some examples, functions may be security actions. In some embodiments, method 300 may further include assigning network identifiers to specific functions.

In an embodiment, network identifiers may identify sub-components of other computing devices.

As illustrated in FIG. 3, at step 306 one or more of the systems described herein may determine outer Internet protocol IP addresses for encapsulated network packets, where the destination IP addresses correspond to destinations on the networks. The systems described herein may perform step 306 in a variety of ways. For example, determining module 105 may, as part of computing device 202, server 206, and/or server 208 in FIG. 2, determine outer Internet protocol IP address 113 for encapsulated network packet 115, where destination IP address 113 corresponds to a destination on network 204.

In some examples, determining the outer IP address for the encapsulated network packet may include using the information identifying the network adapter port to determine the IP address.

As illustrated in FIG. 3, at step 308 one or more of the systems described herein may address outer headers of encapsulated packets with the IP addresses. The systems described herein may perform step 308 in a variety of ways. For example, addressing module 106 may, as part of computing device 202, server 206, and/or server 208 in FIG. 2, address outer IP header 112 of the encapsulated network packet 115 with destination IP address 113 in response to load balancing decision 114.

In some examples, encapsulating may leave contents of received network packets unchanged.

In some embodiments, addressing the outer IP header may further include (1) querying other computing devices to identify virtual subcomponents of the other computing devices and (2) using the external IP addresses of the other computing device as the destination IP addresses.

As illustrated in FIG. 3, at step 310 one or more of the systems described herein may send encapsulated packets toward destinations identified by a destination IP address. The systems described herein may perform step 310 in a variety of ways. For example, sending module 107 may, as part of computing device 202, server 206, and/or server 208 in FIG. 2, send encapsulated network packet 115 toward the destination identified by destination IP address 113.

In some examples, sending may further include (1) determining destinations of the encapsulated packets are within the computing devices, (2) decapsulating the encapsulated packets, and (3) forwarding the decapsulated packets to the destinations in the computing devices.

In some embodiments, method 300 may further include performing functions on the decapsulated packets. The functions may use the information identifying the network adapter port.

In some embodiments, sending may further include (1) determining the destinations of the encapsulated packets are in other computing devices, (2) updating the outer IP headers with respective addresses of the other computing devices, and (3) forwarding the encapsulated packets to the other computing devices.

In some embodiments, method 300 may further include querying other computing devices to identify specific functions of the other computing devices, as well as mapping network identifiers associated with the specific functions of the other computing devices to IP addresses of the other computing devices and/or specific functions of the other computing devices. In some examples, a master computing device may perform the querying during a discovery process. In some examples, results of the querying may enable automatically addressing encapsulated packets to specific functions in specific computing devices based on network identifier information. In some examples, results of the querying may enable automatically readdressing encapsulated packets to specific functions in specific computing devices based on network identifier information.

In some examples, method 300 may further include translating the network identifiers of the specific functions of the other computing devices to the external IP addresses of the other computing devices. Addressing the outer IP headers may further include using the external IP addresses of the other computing devices as the destination IP addresses.

In some examples, tunneling adapters may perform at least a portion of method 300.

In some embodiments, the received network packets may be IPv4 compatible and the encapsulated network packet may be IPv6 compatible. In other examples, the received network packets may be IPv6 compatible and the encapsulated network packet may be IPv4 compatible. In some examples, the received network packet is IPv4 compatible and the encapsulated network packet is IPv4 compatible. In some embodiments, the received network packet is IPv6 compatible and the encapsulated network packet is IPv6 compatible.

Figure 4:
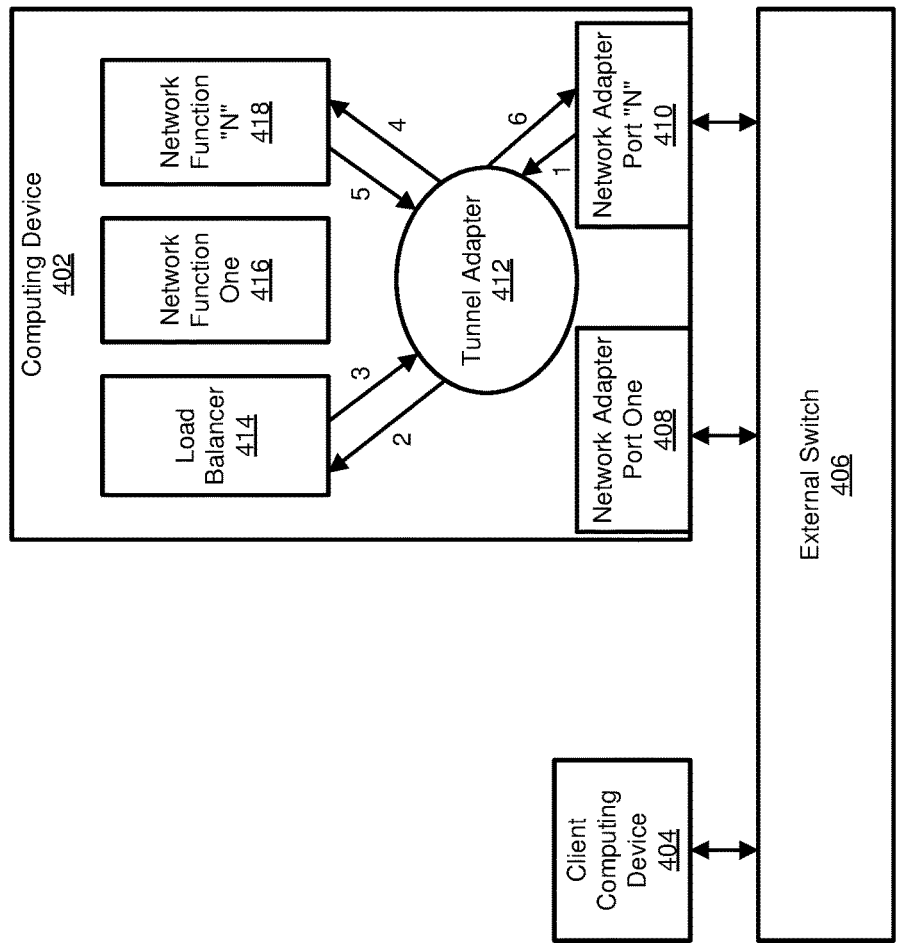
FIG. 4 is a block diagram of an additional example system for preserving system contextual information in an encapsulated packet while load balancing information flows in a single computing device.

FIG. 4 is a block diagram of an additional example system 400 for preserving system contextual information in an encapsulated packet while load balancing information flows in a single computing device. FIG. 4 depicts an example in which a function is to be performed on a network packet (i.e., a target service) by the same computing device in which a load balancer is located. Example system 400 may include a computing device 402, a client computing device 404, and an external switch 406. Computing device 402 may perform network functions.

In some examples, computing device 402 may be at least a part of computing device 202, server 206, and/or server 208 in FIG. 2. Computing device 402 may, using at least one processor of execute one or more of modules 102 from FIG. 1 to enable system 400 to preserve system contextual information in an encapsulated packet.

Computing device 402 may include at least one network adapter port (e.g., network adapter ports 1, 2, . . . N) for communicating packets, such as network adapter port 150 in FIG. 1, network adapter port one 408, and/or network adapter port "N" 410. Computing device 402 may also include a tunnel adapter 412 that enables communicating packets via at least one network adapter port. Tunnel adapter 412 may send and/or receive unencapsulated packets when communicating with client computing devices and servers. However, tunnel adapter 412 may send and/or receive encapsulated packets when communicating with network functions in computing device 402. Computing device 402 may also include a load balancer 414 that may distribute workloads (e.g., processes to be performed by target devices on information carried within packets) across multiple computing resources to increase reliability and capacity of processes. In some examples, network functions, such as network function one 416 and/or network function "N" 418 may perform functions on information carried within packets.

In some examples, client computing device 404 may be at least a part of computing device 202, server 206, and/or server 208 in FIG. 2. Client computing device 404 may generate packets of information upon which network functions must be performed.

In some embodiments, external switch 406 may electronically communicate packets (e.g., network packet 108) between computing and/or network devices. In examples, external switch 406 may be external relative to computing device 402.

In some examples, client computing device 404 may generate packets of information (e.g., network packet 108 in FIG. 1) upon which network functions may be performed. The packets may be received by network adapter port "N" 410 and forwarded to tunnel adapter 412 (ref. #1 in FIG. 4), thus performing step 302. Tunnel adapter 412 may perform encapsulation of received network packets with tunnel headers (e.g., tunnel header 109) to form encapsulated packets (e.g., encapsulated network packet 115) and tunnel adapter 412 may send the encapsulated packets to load balancer 414 (ref. #2 in FIG. 4), thus performing step 304. When performing encapsulation, tunnel adapter 412 may include, in network identifier fields in tunnel headers (e.g., network identifier field 110), information identifying network adapter ports (e.g., information identifying the network adapter port 111) via which the packets were received (e.g., network adapter ports 1, 2, . . . N, network adapter port one 408, and/or network adapter port "N" 410). In some embodiments, including information identifying network adapter ports in network identifier fields in tunnel headers may preserve system contextual information in encapsulated packets.

Load balancer 414 may create a load balancer decision (e.g., load balancer decision 114) about the inner packets within the encapsulated packets and update the destination IP addresses (e.g., destination IP address 113) accordingly, thus performing step 306. In some embodiments, load balancer 414 may leave the inner packets unchanged. Load balancer 414 may return the encapsulated packets to tunnel adapter 412 (ref. #3 in FIG. 4) for forwarding to the destination IP addresses. Tunnel adapter 412 may decapsulate the packets and forward the decapsulated packets to destinations identified by the destination IP addresses.

When the target network functions are located within computing device 402, tunnel adapter 412 may forward the encapsulated packets to a network function (e.g., network function one 416, network function "N" 418) in computing device 402 (ref. #4 in FIG. 4). The network functions may decapsulate the packets and perform operations on the decapsulated packets. The network functions may use the information identifying the network adapter port while processing the decapsulated packets. The network functions may then packetize and encapsulate processed information along with a destination address and send the encapsulated packets to tunnel adapter 412 (ref. #5 in FIG. 4). In some examples, the destination address may be some other network function (either in computing device 402 or another computing device). In some embodiments, the destination address may indicate to tunnel adapter 412 that tunnel adapter 412 must forward the packets to client computing device 404 or a server (e.g., via a specific egress network adapter port indicated by the tunnel header). Tunnel adapter 412 decapsulates the packets and may send the decapsulated packets according to the destination address of the packets (e.g., to network adapter ports (ref. #5 in FIG. 4)). In some examples, the decapsulated packets may be forwarded to client computing device 404. In some embodiments, there is no requirement that processed packets be returned via the same network adapter ports upon which the received network packets arrived.

Figure 5:
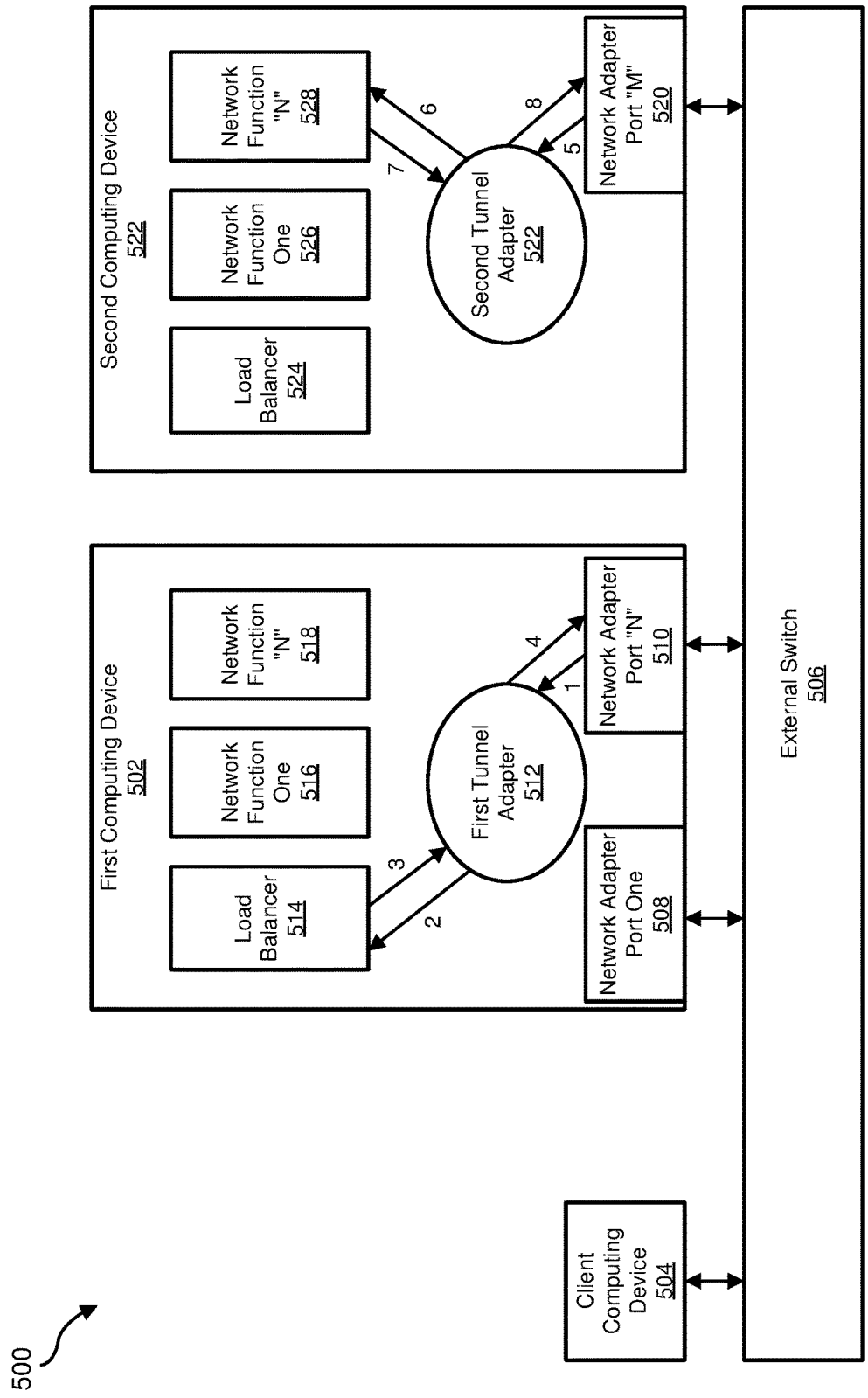
FIG. 5 is a block diagram of an additional example system for preserving system contextual information in an encapsulated packet while load balancing information flows in multiple computing devices.

FIG. 5 is a block diagram of an additional example system 500 for preserving system contextual information in an encapsulated packet while load balancing information flows in multiple computing devices. FIG. 5 depicts an example in which a function is to be performed on a network packet by a computing device other than the computing device in which a load balancer is located. FIG. 5 also depicts an example in which a tunnel adapter may perform translation of network identifier information to an external IP network address. In some examples, the tunnel adapter may automatically assign a specific destination IP address to an encapsulated network packet (e.g., by rewriting an IP address of the packet) based on network identifier field information. In some examples, network identifier information may identify a particular network function provided by a specific computing device.

Example system 500 may include a first computing device 502, a client computing device 504, an external switch 506, and a second computing device 522. First computing device 502 and/or second computing device 522 may perform network functions.

In some examples, first computing device 502 may be at least a part of computing device 202, server 206, and/or server 208 in FIG. 2. First computing device 502 may, using at least one processor of execute one or more of modules 102 from FIG. 1 to enable system 500 to preserve system contextual information in an encapsulated packet.

First computing device 502 may include at least one network adapter port (e.g., network adapter ports 1, 2, . . . N) for communicating packets, such as network adapter port 150 in FIG. 1, network adapter port one 508, and/or network adapter port "N" 510. First computing device 502 may also include a first tunnel adapter 512 that enables communicating packets via at least one network adapter port. First tunnel adapter 512 may send and/or receive unencapsulated packets when communicating with client computing device 504 and/or servers. Also, first tunnel adapter 512 may send and/or receive encapsulated packets when communicating with network functions in first computing device 502 and/or in second computing device 522. First computing device 502 may also include a first load balancer 514 that may distribute workloads (e.g., processes to be performed by target device on information carried within packets) across multiple computing resources to increase reliability and capacity of processes. In some examples, network functions, such as network function one 516 and/or network function "N" 518 may perform functions on information carried within packets.

In some examples, client computing device 504 may be at least a part of computing device 202, server 206, and/or server 208 in FIG. 2. Client computing device 504 may generate packets of information upon which network functions must be performed.

In some embodiments, external switch 506 may electronically communicate packets (e.g., network packet 108) between computing and/or network devices. In examples, external switch 506 may be external relative to first computing device 502 and/or second computing device 522.

In some examples, second computing device 522 may be at least a part of computing device 202, server 206, and/or server 208 in FIG. 2. Second computing device 522 may, using at least one processor, execute one or more of modules 102 from FIG. 1 to enable system 500 to preserve system contextual information in an encapsulated packet.

Second computing device 522 may include at least one network adapter port (e.g., network adapter ports 1, 2, . . . N) for communicating packets, such as network adapter port 150 in FIG. 1 and/or network adapter port "M" 520. Second computing device 522 may also include a second tunnel adapter 522 that enables communicating packets via at least one network adapter port. In some examples, second tunnel adapter 522 may be implemented in hardware devices. Second tunnel adapter 522 may send and/or receive unencapsulated packets when communicating with client computing device 504 and/or server computing devices. Also, second tunnel adapter 522 may send and/or receive encapsulated packets when communicating with network functions in first computing device 502 and/or in second computing device 522. Second computing device 522 may also include a second load balancer 524 that may distribute workloads (e.g., processes to be performed by network functions on information carried within packets) across multiple computing resources to increase reliability and capacity of processes. In some examples, network functions, such as network function one 526 and/or network function "N" 528 may perform functions on information carried within packets.

In some examples, client computing device 504 may generate packets of information (e.g., network packet 108 in FIG. 1) upon which network functions may be performed. Network adapter port "N" 510 may receive the packets and forward the packets to first tunnel adapter 512 (ref. #1 in FIG. 5), thus performing step 302. First tunnel adapter 512 may perform encapsulation of received network packets with tunnel headers (e.g., tunnel header 109) to form encapsulated packets (e.g., encapsulated network packet 115) and send the encapsulated packets to load balancer 514 (ref. #2 in FIG. 5), thus performing step 304. When performing encapsulation, first tunnel adapter 512 may include, in network identifier fields in tunnel headers (e.g., network identifier field 110), information identifying network adapter ports (e.g., information identifying the network adapter port 111) via which the packets were received (e.g., network adapter ports 1, 2, . . . N, network adapter port 150 in FIG. 1, network adapter port one 508, and/or network adapter port "N" 510). In some embodiments, including information identifying network adapter ports in network identifier fields in tunnel headers may preserve system contextual information in encapsulated packets.

First load balancer 514 may decapsulate the packets and create a load balancer decision (e.g., load balancer decision 114) about the inner packets, encapsulate the packets and update the destination IP addresses (e.g., destination IP address 113) accordingly, thus performing step 306. In some embodiments, first load balancer 514 may leave the inner packets unchanged. First load balancer 514 may return the encapsulated packets to first tunnel adapter 512 (ref. #3 in FIG. 5) for forwarding to the destination IP addresses. First tunnel adapter 512 may forward the encapsulated packets to network function destinations identified by the destination IP addresses. In some embodiments, first tunnel adapter 512 may use the network identifier in the tunnel headers to identify that target network functions are located outside of first computing device 502, may retrieve new IP addresses from mapping that corresponds network identifiers to IP addresses, and may accordingly change destination IP addresses to new IP addresses. In some examples, different IP addresses may be used inside first computing device 502 and inside second computing device 522.

When the target network functions are located outside of first computing device 502, first tunnel adapter 512 may forward the encapsulated packets to a network function (e.g., network function one 526, network function "N" 528) in another computing device (e.g., second computing device 522) (ref. #4 in FIG. 5). External switch 506 may communicate the encapsulated packets between first computing device 502 and second computing device 522.

Encapsulated packets may be received at network adapter port "M" 520 in the second computing device and forwarded to second tunnel adapter 522 (ref. #5 in FIG. 5). Second tunnel adapter 522 may determine which specific network function the packet must be delivered to and update the outer IP address and MAC address in the tunnel header to reflect the destination network function and then send the encapsulated packets to network function "N" 528 (ref. #6 in FIG. 5).

The network functions may decapsulate the packets and perform operations on the information in the packets. The network functions may use the information identifying the network adapter port while processing the decapsulated packets. The network functions may then packetize and encapsulate processed information along with a destination address and send the encapsulated packets to network adapter ports via second tunnel adapter 522 (refs. #7-8 in FIG. 5). In some examples, the processed packets may be decapsulated by second tunnel adapter 522 and forwarded to client computing device 504. In some embodiments, there is no requirement that processed packets be returned via the same network adapter ports upon which the received network packets arrived.

Figure 6:
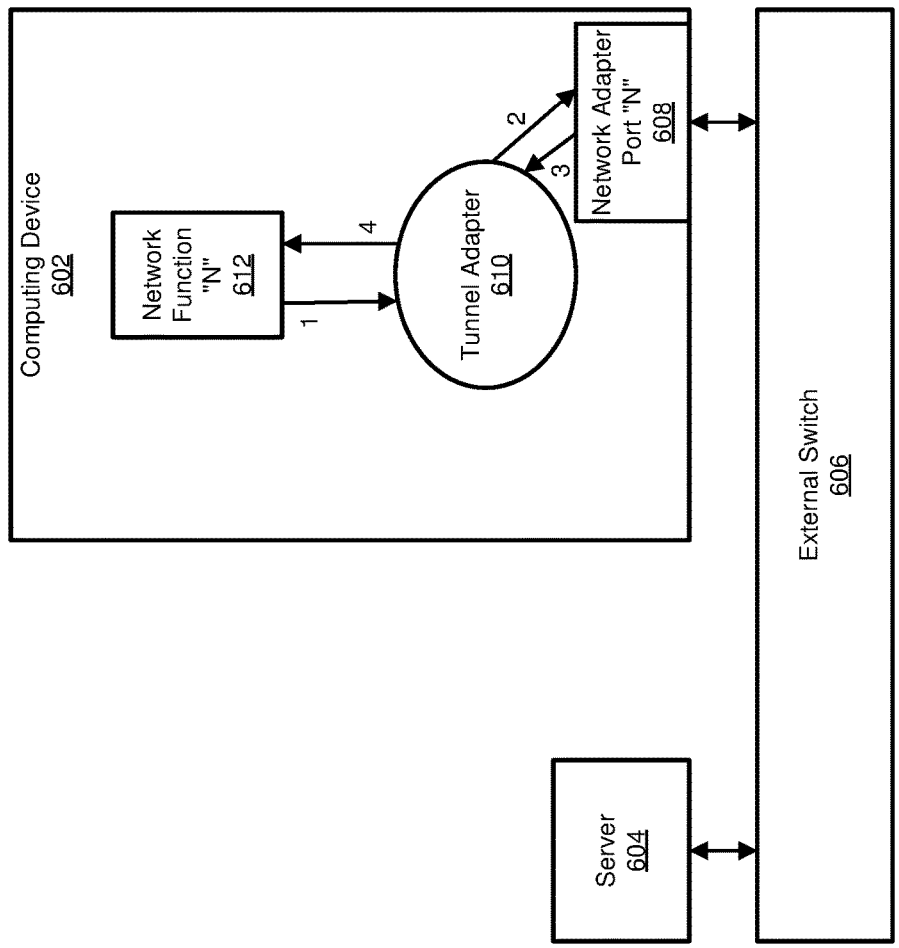
FIG. 6 is a block diagram of an additional example system for preserving system contextual information in an encapsulated packet when a network function originates information flows.

FIG. 6 is a block diagram of an additional example system for preserving system contextual information in an encapsulated packet 600 when a network function originates information flows. Example system 600 may include a computing device 602, a server 604, and an external switch 606. Computing device 602 may perform network functions.

In some examples, computing device 602 may be at least a part of computing device 202, server 206, and/or server 208 in FIG. 2. Computing device 602 may, using at least one processor of execute one or more of modules 102 from FIG. 1 to enable system 600 to preserve system contextual information in an encapsulated packet.

Computing device 602 may include at least one network adapter port (e.g., network adapter ports 1, 2, . . . N) for communicating packets, such as network adapter port 150 in FIG. 1 and/or network adapter port "N" 608. Computing device 602 may also include a tunnel adapter 610 that enables communicating packets via at least one network adapter port. Tunnel adapter 610 may send and/or receive unencapsulated packets when communicating with client computing devices and/or server 604. Also, tunnel adapter 610 may send and/or receive encapsulated packets when communicating with network functions in computing device 602 and/or network functions in another computing device.

In some examples, network functions, such as network function "N" 612, may perform functions on information carried within packets. In some examples, network functions such as network function "N" 612 may generate packets. For example, a network function may generate packets to manage network packet traffic, control network packet traffic, connect to an authentication server, and/or the like. Network functions may access an external network, such as server 604, for reasons other than working on packets originated by another computing device. Since the network functions only have access to networks inside the computing device in which the network functions are located (e.g., computing device 602) and tunnel adapters inside the computing device in which the network functions are located (e.g., tunnel adapter 610), the network functions are configured to inform the tunnel adapters which network adapter ports to use, and to what addresses to send the packets via those network adapter ports.

In some examples, server 604 may be at least a part of computing device 202, server 206, and/or server 208 in FIG. 2. Server 604 may generate packets of information upon which network functions must be performed.

In some embodiments, external switch 606 may electronically communicate packets (e.g., network packet 108) between computing and/or network devices. In examples, external switch 606 may be external relative to computing device 602.

In some examples, network function "N" 612 may generate packets of information (e.g., network packet 108 in FIG. 1) upon which functions may be performed by a computing device other than computing device 602, such as server 604. Network function "N" 612 may perform encapsulation of network packets with tunnel headers (e.g., tunnel header 109) to form encapsulated packets (e.g., encapsulated network packet 115) and send the encapsulated packets to tunnel adapter 610 (ref. #1 in FIG. 6). When performing encapsulation, network function "N" 612 may include, in network identifier fields in tunnel headers (e.g., network identifier field 110), information identifying network adapter ports (e.g., information identifying the network adapter port 111, information identifying network adapter port "N" 608, etc.) via which the packets are to be transmitted (e.g., network adapter ports 1, 2, . . . N, network adapter port 150 in FIG. 1, network adapter port "N" 608). In some embodiments, including information identifying network adapter ports in network identifier fields in tunnel headers may preserve system contextual information in encapsulated packets.

Network function "N" 612 may also decide the destination of the packets and address destination IP addresses (e.g., destination IP address 113) accordingly. Network function "N" 612 may send the encapsulated packets to tunnel adapter 610 (ref. #1 in FIG. 6) for forwarding to the destination IP addresses. Tunnel adapter 610 may perform decapsulation of received network packets and may forward the decapsulated packets to destinations identified by the destination IP addresses via network adapter ports (e.g., network adapter port "N" 608) (ref. #2 in FIG. 6). External switch 606 may communicate the decapsulated packets between computing device 602 and server 604. When the target network functions are located outside of computing device 602, tunnel adapter 610 may forgo decapsulation and forward the encapsulated packets to network functions in another computing device (e.g., by addressing outer IP addresses and MAC addresses).

Packets may be received at server 604, which may perform operations on the received packets. The server 604 may return processed and packetized information to network adapter ports (e.g., network adapter port "N" 608) in computing device 602. In some embodiments, there is no requirement that processed packets be returned via the same network adapter ports from which the received network packets were sent.

Packets may be received at network adapter port "N" 608 in computing device 602 and forwarded to tunnel adapter 610 (ref. #3 in FIG. 6). Tunnel adapter 610 may perform encapsulation of received network packets and may send the encapsulated packets to network function "N" 612 (ref. #4 in FIG. 5).

Figure 7:
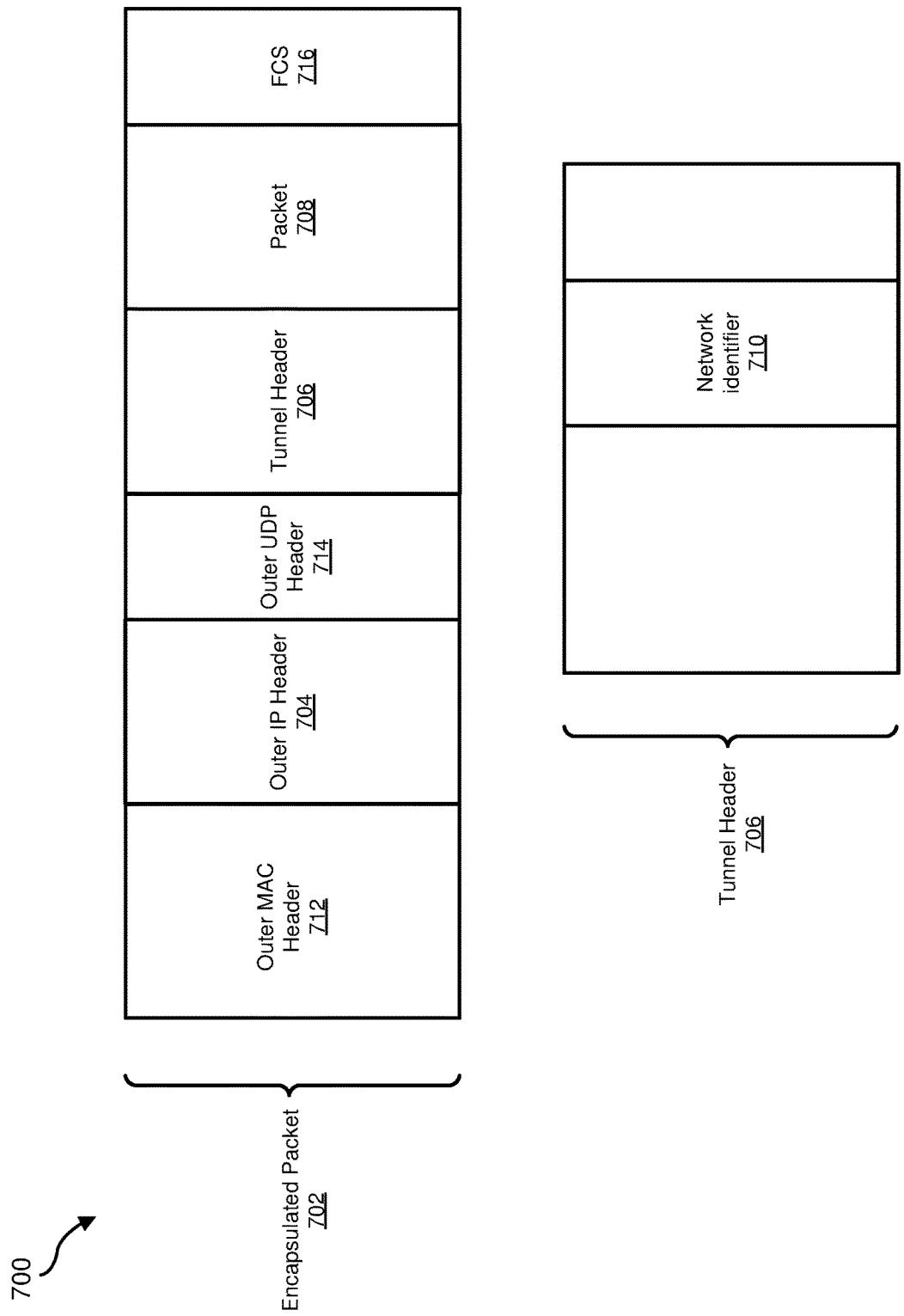
FIG. 7 is a block diagram of an example encapsulated network packet including a network identifier in a tunnel header.

FIG. 7 is a block diagram 700 of an example encapsulated network packet 702, such as encapsulated network packet 115 in FIG. 1. In some examples, encapsulated network packet 702 may include an outer IP header 704, a tunnel header 706, a network packet 708, an outer Media Access Control (MAC) header 712, an outer User Datagram Protocol (UDP) header 714, and a frame check sequence (FCS) 716.

In some examples, outer IP header 704 may include a destination IP address (e.g., destination IP address 113) indicating the destination of encapsulated network packet 702.

In some examples, tunnel header 706 may include a network identifier field 710 (e.g., network identifier field 110). Network identifier field 710 may include information identifying network adapter ports (e.g., information identifying the network adapter port 111). In some embodiments, including information identifying network adapter ports in network identifier fields in tunnel headers may preserve system contextual information in encapsulated packets. In some embodiments, network packet 708 may represent information to be communicated and/or processed by a network function. In some embodiments, network packet 708 has an inner MAC address and an inner IP address (that is, "inner" relative to outer MAC header 712 and outer IP header 704).

Figure 8:
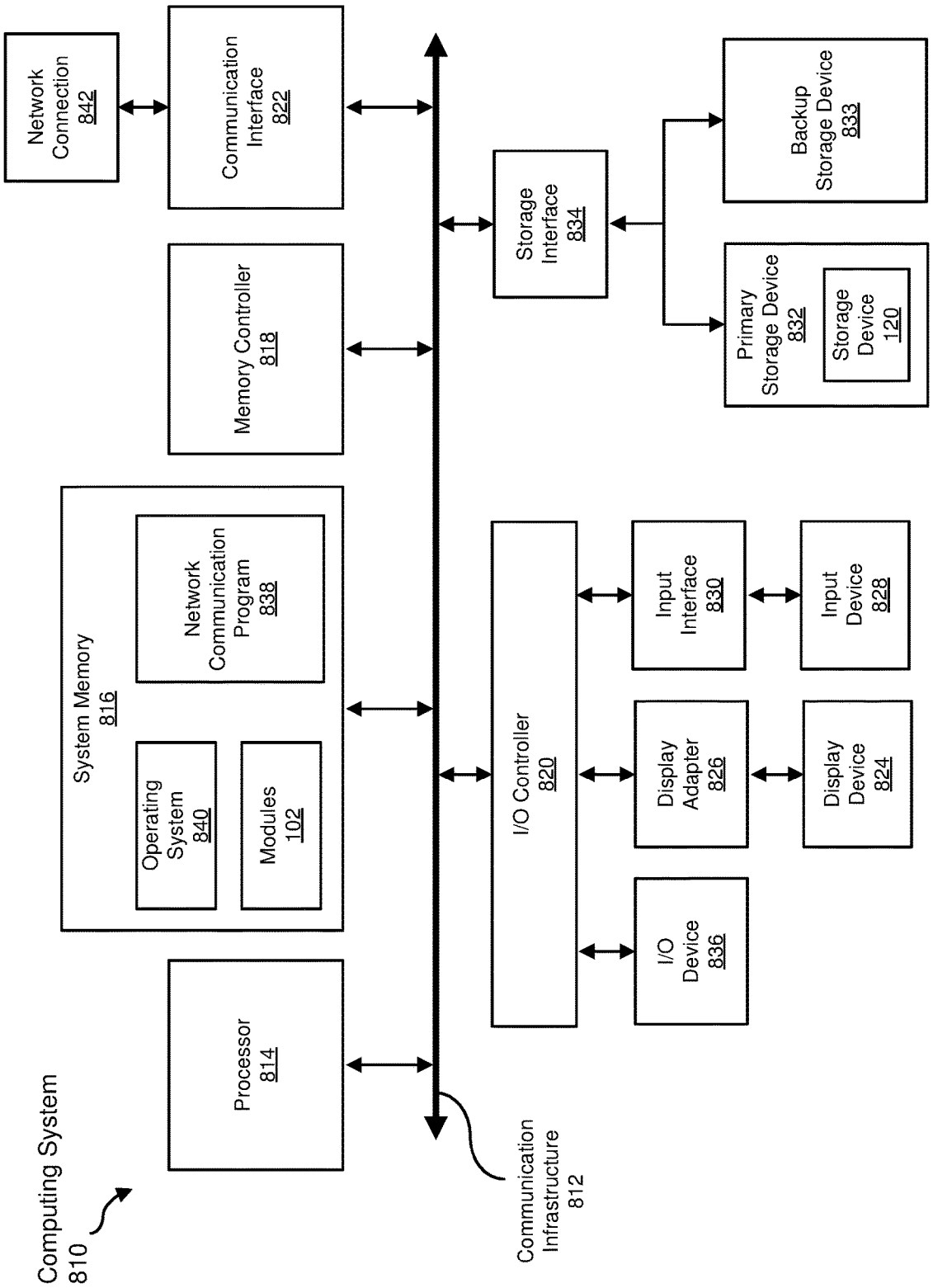
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In some examples, one or more of modules 102 from FIG. 1 may be loaded into system memory 816.

In some examples, system memory 816 may store and/or load an operating system 840 for execution by processor 814. In some examples, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In some examples, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like.

Storage interface 834 generally represents any type or form of interface or device for transferring data between storage devices 832 and 833 and other components of computing system 810. In some examples, storage device 120 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
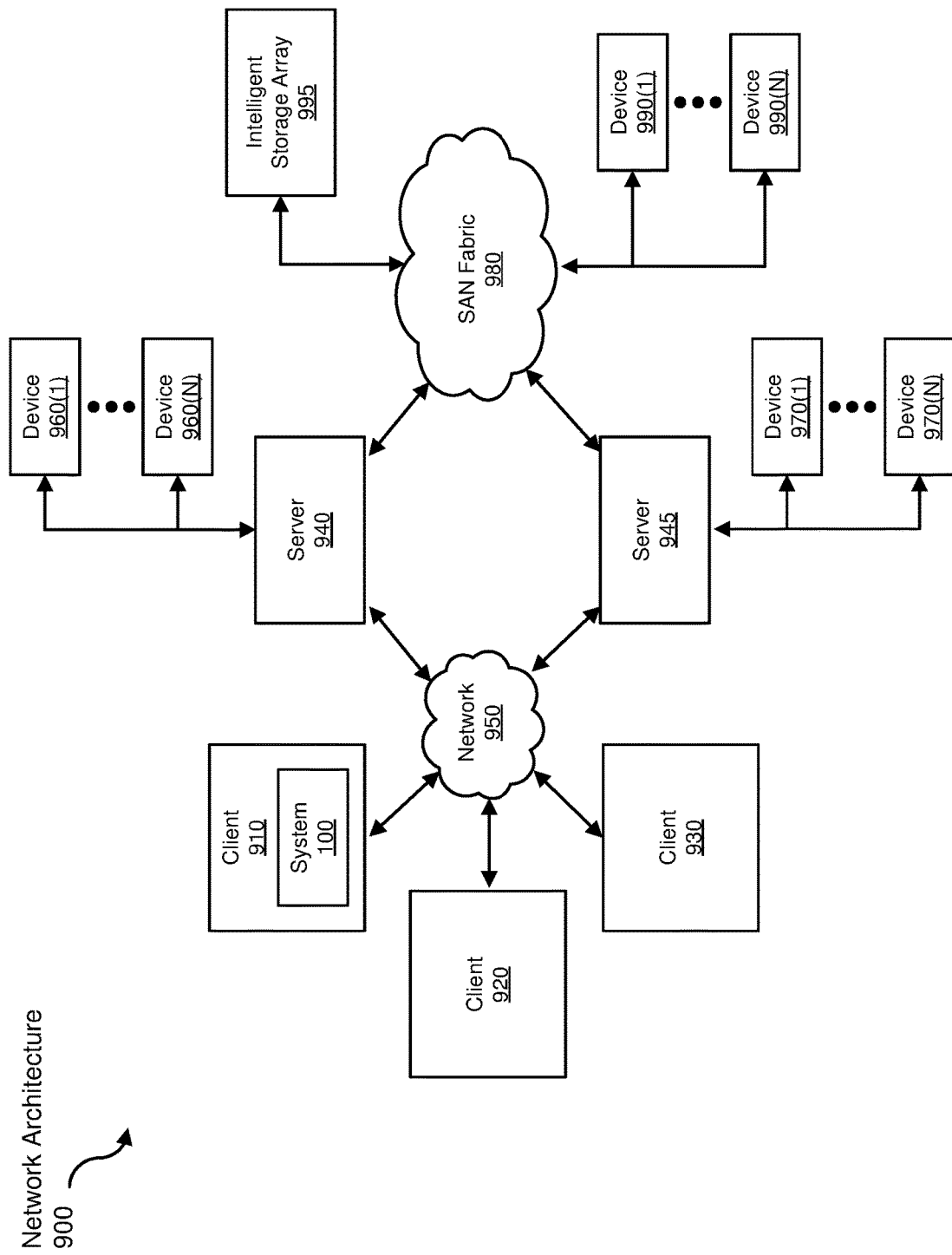
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In some examples, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for preserving system contextual information in an encapsulated packet.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a tunnel header to be transformed, transform the tunnel header, output a result of the transformation to a computing device and/or an external switch, use the result of the transformation to perform a network function, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preserving system contextual information in an encapsulated packet, at least a portion of the method being performed by a computing device comprising at least one processor, the computing device being connected to a network, the method comprising:

receiving, at the computing device, a network packet from the network via a network adapter port;

encapsulating the received network packet with a tunnel header, wherein a network identifier field in the tunnel header comprises information identifying the network adapter port via which the network packet was received;

determining an outer Internet protocol (IP) address for the encapsulated network packet;

sending the encapsulated packet to a load balancer;

receiving the encapsulated packet from the load balancer, wherein the received encapsulated packet has a destination IP address, assigned by the load balancer, that updates the outer IP address; and sending the encapsulated network packet toward the destination identified by the destination IP address.

2. The computer-implemented method of claim 1, wherein the network identifier field further comprises information describing at least one of:

network adapter port information; and a function to be performed on the received network packet.

3. The computer-implemented method of claim 1, further comprising:

identifying a function to be performed on the received network packet; and assigning a network identifier to the network identifier field based on the function to be performed.

4. The computer-implemented method of claim 3, wherein the function to be performed is to be performed by another computing device.

5. The computer-implemented method of claim 3, wherein the function is a security action.

6. The computer-implemented method of claim 1, further comprising assigning a network identifier to a specific function.

7. The computer-implemented method of claim 1, wherein a network identifier identifies a subcomponent of another computing device.

8. The computer-implemented method of claim 1, wherein encapsulating leaves contents of the received network packet unchanged.

9. The computer-implemented method of claim 1, wherein addressing the outer IP header further comprises:

querying another computing device to identify a virtual subcomponent of the other computing device; and using the external IP address of the other computing device as the destination IP address.

10. The computer-implemented method of claim 1, wherein sending the encapsulated packet toward the destination further comprises:

determining the destination of the encapsulated network packet is within the computing device;

decapsulating the encapsulated packet; and forwarding the decapsulated network packet to the destination in the computing device.

11. The computer-implemented method of claim 10, further comprising performing a function on the decapsulated packet, wherein the function uses the information identifying the network adapter port.

12. The computer-implemented method of claim 1, wherein sending the encapsulated packet toward the destination further comprises:

determining the destination of the encapsulated network packet is in another computing device;

updating the outer IP header with a respective address of the other computing device; and forwarding the encapsulated network packet to the other computing device.

13. The computer-implemented method of claim 1, further comprising:

querying another computing device to identify a specific function of the other computing device; and mapping a network identifier associated with the specific function of the other computing device to an external IP address of the other computing device.

14. The computer-implemented method of claim 13, further comprising translating the network identifier of the specific function of the other computing device to the external IP address of the other computing device, wherein addressing the outer IP header further comprises using the external IP address of the other computing device as the destination IP address.

15. The computer-implemented method of claim 1, wherein:

the received network packet is IPv4 compatible and the encapsulated network packet is IPv6 compatible;

the received network packet is IPv6 compatible and the encapsulated network packet is IPv4 compatible;

the received network packet is IPv4 compatible and the encapsulated network packet is IPv4 compatible; or the received network packet is IPv6 compatible and the encapsulated network packet is IPv6 compatible.

16. The computer-implemented method of claim 1, wherein determining the outer IP address for the encapsulated network packet further comprises using the information identifying the network adapter port to determine the outer IP address.

17. A system for preserving system contextual information in an encapsulated packet, the system comprising:

at least one physical processor connected to a network; and physical memory comprising computer-executable instructions that, when executed by the physical processor, cause the physical processor to:

receive a network packet from the network via a network adapter port;

encapsulate the received network packet with a tunnel header, wherein a network identifier field in the tunnel header comprises information identifying the network adapter port via which the network packet was received;

determine an outer Internet protocol (IP) address for the encapsulated network;

send the encapsulated packet to a load balancer;

receive the encapsulated packet from the load balancer, wherein the received encapsulated packet has a destination IP address, assigned by the load balancer, that updates the outer IP address; and send the encapsulated network packet toward the destination identified by the destination IP address.

18. The system of claim 17, wherein the network identifier field further comprises information describing at least one of:

network adapter port information; and a function to be performed on the received network packet.

19. A non-transitory computer-readable medium comprising one or more computer-executable instructions that, when executed by at least one processor of a computing device connected to a network, cause the computing device to:

receive, at the computing device, a network packet from the network via a network adapter port;

encapsulate the received network packet with a tunnel header, wherein a network identifier field in the tunnel header comprises information identifying the network adapter port via which the network packet was received;

determine an outer Internet protocol (IP) address for the encapsulated network packet;

send the encapsulated packet to a load balancer;

receive the encapsulated packet from the load balancer, wherein the received encapsulated packet has a destination IP address, assigned by the load balancer, that updates the outer IP address; and send the encapsulated network packet toward the destination identified by the destination IP address.

20. The non-transitory computer-readable medium of claim 19, wherein the network identifier field further comprises information describing at least one of:

network adapter port information; and a function to be performed on the received network packet.

21. The computer-implemented method of claim 1, wherein the load balancer operations on the encapsulated packet change only the outer IP address.

22. The computer-implemented method of claim 1, wherein the load balancer is located in the computing device.

23. The computer-implemented method of claim 1, further comprising:

forwarding the encapsulated packet to a network function in the computing device;

decapsulating, using the network function, the encapsulated packet; and performing an operation, on the decapsulated packet, that uses the information identifying the network adapter port.

24. The computer-implemented method of claim 1, wherein the network identifier field in the tunnel header comprises information identifying a load-balanced network function to be performed on the received network packet.

* * * * *